United States Patent
Delire

Patent Number: 5,878,990
Date of Patent: Mar. 9, 1999

[54] DEVICE FOR SUPPORTING AN ELECTRIC MOTOR DRIVING A TURBINE, NOTABLY FOR HEATING AND/OR AIR CONDITIONING EQUIPMENT OF A MOTOR VEHICLE

[75] Inventor: Philippe Delire, Le Mans, France

[73] Assignee: Valeo Climatisation, La Verriere, France

[21] Appl. No.: 684,424

[22] Filed: Jul. 19, 1996

[30] Foreign Application Priority Data

Jul. 21, 1995 [FR] France .................................. 95 08892

[51] Int. Cl.⁶ .......................... F16M 13/00; F16M 9/00; H02K 9/00
[52] U.S. Cl. ............................ 248/604; 248/674; 310/59
[58] Field of Search ................................ 248/603, 604, 248/674; 310/58, 59, 60 R, 60 A, 64

[56] References Cited

U.S. PATENT DOCUMENTS

| | | | |
|---|---|---|---|
| 2,936,141 | 5/1960 | Rapata | 248/604 |
| 3,065,941 | 11/1962 | Loftis | 248/604 |
| 3,502,916 | 3/1970 | Stavrache et al. | |
| 4,877,984 | 10/1989 | Colwell et al. | 248/674 |
| 4,911,609 | 3/1990 | Anderson et al. | 248/674 |
| 5,069,415 | 12/1991 | Mechalas | 248/604 |

FOREIGN PATENT DOCUMENTS

| | | |
|---|---|---|
| 0 293 277 | 11/1988 | European Pat. Off. . |
| 0 564 938 | 10/1993 | European Pat. Off. . |
| 2 412 976 | 12/1977 | France . |

Primary Examiner—Charles A. Marmor
Assistant Examiner—Matthew A. Kaness
Attorney, Agent, or Firm—Morgan & Finnegan, L.L.P.

[57] ABSTRACT

A device for supporting an electric motor driving a turbine, which is particularly applicable for heating and/or air conditioning equipment for a motor vehicle. The device comprises a casing which defines a housing for receiving an enclosure of the motor. The housing comprises a peripheral wall connected to a front wall. The peripheral wall is interrupted so as to define at least one channel for cooling the motor. The cooling channel is defined by two lateral walls, at least one of which is connected to the font wall by an inclined deflecting wall to facilitate the guidance of the flow of air for cooling the motor.

10 Claims, 3 Drawing Sheets

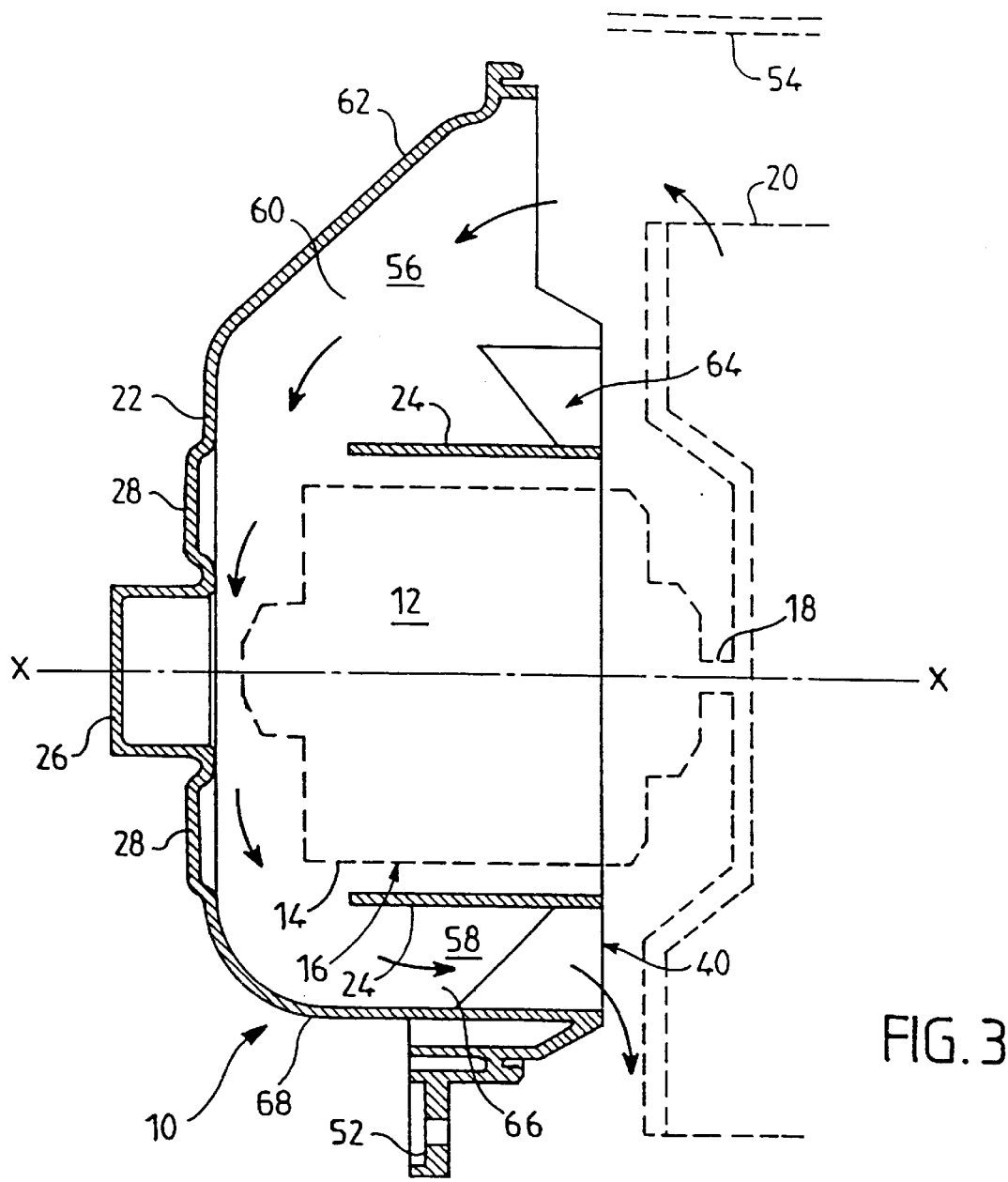
FIG. 3
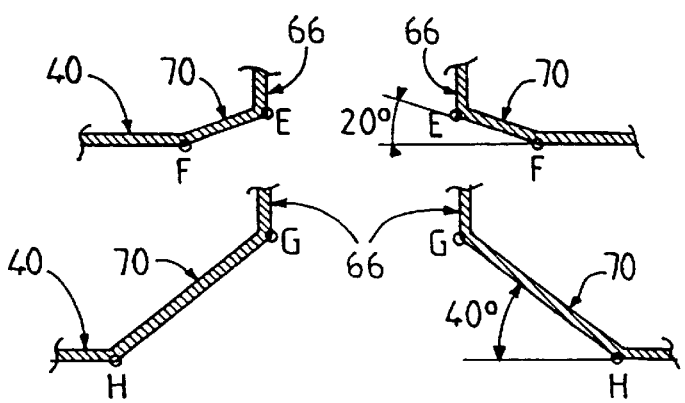
FIG. 4
FIG. 5

DEVICE FOR SUPPORTING AN ELECTRIC MOTOR DRIVING A TURBINE, NOTABLY FOR HEATING AND/OR AIR CONDITIONING EQUIPMENT OF A MOTOR VEHICLE

BACKGROUND OF THE INVENTION

The invention concerns a device for supporting an electric motor driving a turbine, notably for motor vehicle heating and/or air conditioning equipment.

REVIEW OF THE PRIOR ART

A device disclosed by the publication FR-A-2 412 976, comprises a casing formed so as to define a housing to receive the enclosure of the motor, which opens out into a volute for receiving the turbine. The housing comprises a base wall connected to a peripheral wall, itself connected to a substantially annular front wall forming part of the volute. The peripheral wall is interrupted so as to define at least one channel for cooling the motor, the cooling channel being defined by two lateral walls opposite each other which extend in a substantially radial direction with respect to the axis of rotation of the motor.

A motor/turbine assembly, also called a "motor-driven fan" is designed to draw in a flow of air coming from outside the passenger compartment of the vehicle or a flow of air recirculated from within the passenger compartment and to then send it into the passenger compartment once it has been heated or cooled by a suitable heat exchanger.

Cooling channels or a cooling channel formed in a casing supporting the motor are designed to divert part of the flow of air set in motion by the turbine, so as to cool the electric motor. Generally, the casing defines two cooling channels opposite each other. As a result, this part of the flow of air enters a channel serving as an air inlet, then sweeps the parts of the motor to be cooled and is discharged through the other channel, which serves as a discharge channel.

The support devices known up to now do not always afford total satisfaction, since they do not allow for the correct guidance of the flow of air serving to cool the electric motor.

Furthermore, they very often generate a high noise level, which compromises the comfort of use of the heating and/or air conditioning equipment.

Another problem associated with this type of device is the fact that it is necessary on each occasion to provide a different casing according to the direction of rotation of the turbine, the latter being dependent on the vehicle on which the heating and/or air conditioning device is to be installed. This is because, up to now, it has been necessary to provide different directions of rotation according to whether the equipment is intended for a right-hand drive vehicle or a left-hand drive vehicle, or depending on the internal arrangement of the components which make it up.

The object of the invention is to overcome or at least partially mitigate the aforementioned drawbacks.

SUMMARY OF THE INVENTION

To this end, the present invention proposes a device of the type comprising a casing formed so as to define a housing to receive the enclosure of the motor, which opens out into a volute for receiving the turbine, the housing comprising a base wall connected to a peripheral wall, itself connected to a substantially annular front wall forming part of the volute, and in which the peripheral wall is interrupted so as to define at least one channel for cooling the motor, said cooling channel being defined by two lateral walls opposite each other which extend in a substantially radial direction with respect to the axis of rotation of the motor, wherein at least one of the two lateral walls of the cooling channel is connected to the annular front wall by an inclined deflecting wall.

Whereas up to now the lateral walls of the cooling channel or channels were connected to the annular front wall along a sharp edge forming an angle of around 90°, the invention provides that this connection will take place, for at least one of the two lateral walls of the channel, by means of a deflecting wall forming a kind of curved fin.

The presence of this deflecting wall thus ensures a gentle transition between the annular front wall and the lateral wall of the cooling channel, which improves the guidance of the flow of cooling air both for its admission and its discharge.

In a simplified embodiment of the invention, only one of the two lateral walls of the cooling channel or each cooling channel is connected to the annular front wall by an inclined deflecting wall.

This embodiment is particularly suitable in cases where the support is designed to receive a motor activating a turbine in a clearly defined direction of rotation. In such a case, the deflecting wall is situated to the front of the cooling channel with respect to the direction of rotation of the propeller.

In this simplified embodiment, two deflecting walls are thus found which are associated respectively with the two cooling channels, in cases where the device has two cooling channels.

In a more elaborate embodiment, the two lateral walls of the cooling channel or each cooling channel are each connected to the annular front wall by two deflecting walls.

This embodiment is particularly suitable in the case of a supportable to receive an electric motor regardless of whether it is driving a turbine in one direction of rotation or another.

As a result, the same support device can be used both for right-hand drive vehicles and left-hand drive vehicles.

In the latter embodiment, the two deflecting walls of a cooling channel advantageously have a symmetrical configuration with respect to a radial plane passing through the axis of rotation of the motor and through the middle of the cooling channel.

In a device of the aforementioned type, the annular front wall has a curved inner edge and a curved outer edge.

According to one characteristic of the invention, the deflecting wall is connected to the front wall, forming with it an angle which varies from the curved inner edge to the curved outer edge of the annular front wall.

This angle of connection is smaller at the inner edge than at the outer edge.

By way of example, the angle of connection at the inner edge is around 20° and the angle of connection at the outer edge is around 40°.

According to another characteristic of the invention, the deflecting wall is connected to the front wall along a radial edge contained within the plane of the front wall.

Preferably, the deflecting wall is connected to the lateral wall of the cooling channel along a non-radial edge.

The device of the invention preferably comprises two cooling channels opposite each other.

BRIEF DESCRIPTION OF THE DRAWINGS

In the description which follows, given solely by way of example, reference is made to the accompanying drawings, in which:

FIG. 3 is a view in cross section of the device along the line III—III in FIG. 1 or FIG. 2;

FIG. 4 is a partial view in cross section along the broken line F-E-E-F in FIG. 2; and FIG. 5 is a partial view in cross section along the broken line H-G-G-H in FIG. 2.

DESCRIPTION OF THE PREFERRED EMBODIMENTS

Figure 1:
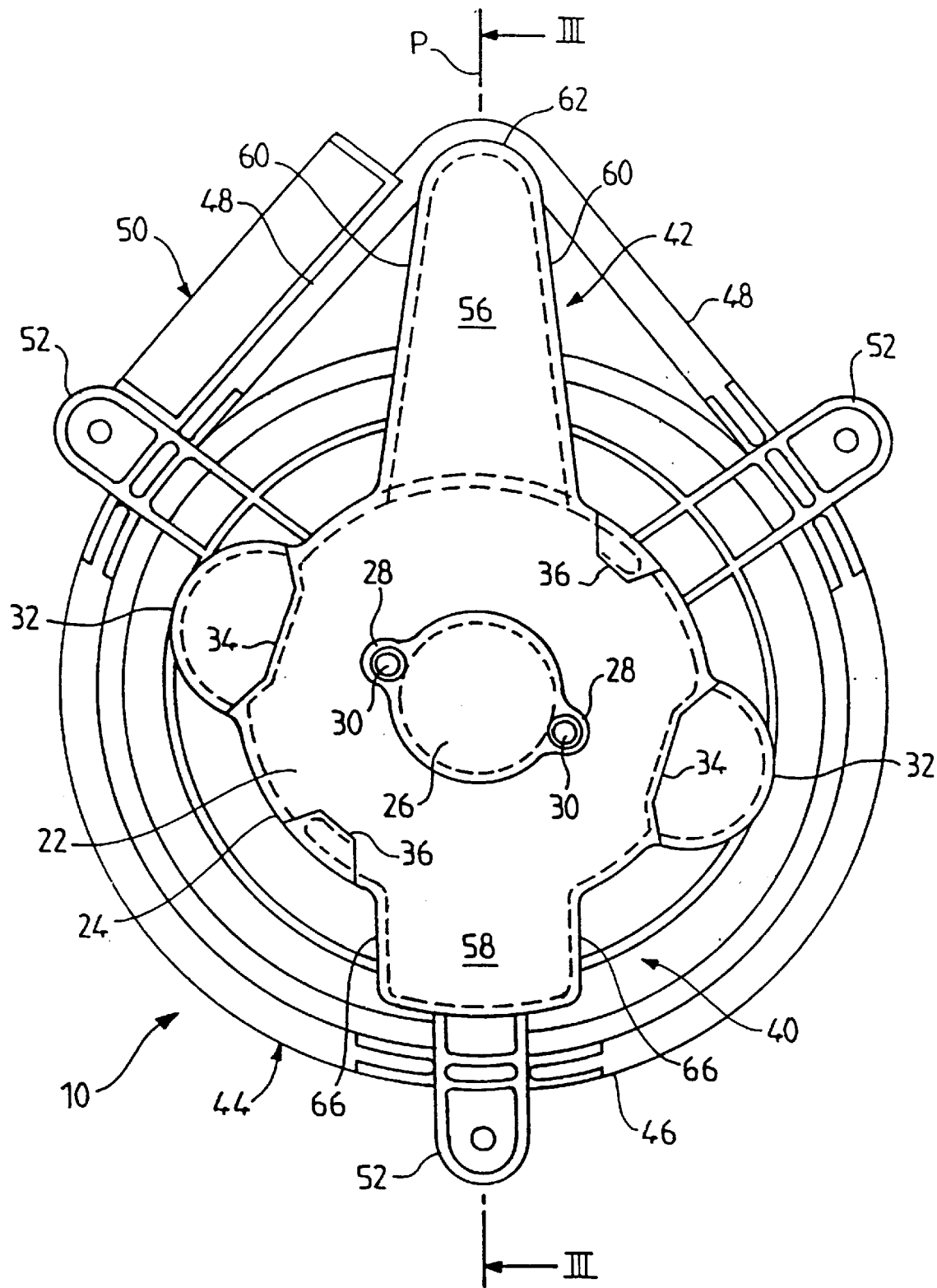
FIG. 1 is a plan view of a support device according to the invention.
Figure 2:
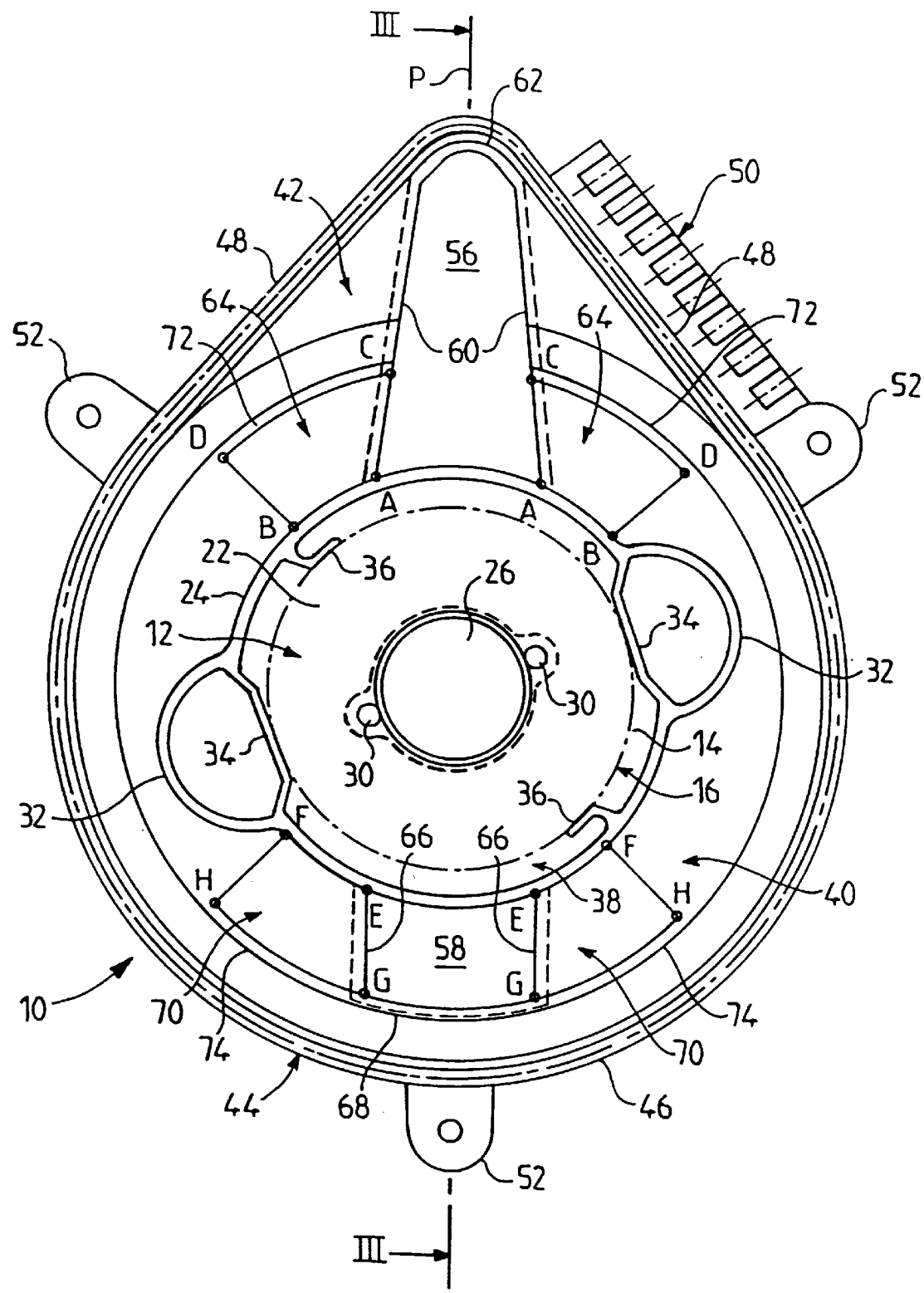
FIG. 2 is a view of this device from below.

The device depicted in FIGS. 1 to 3 comprises a casing 10 obtained by moulding a plastic material and formed so as to define a housing 12 (FIGS. 2 and 3) suitable for receiving the enclosure 14 of an electric motor 16. The motor 16 (FIG. 3) comprises a shaft 18 able to be rotated about an axis X-X, and with a turbine 20 fixed to it. The motor/turbine assembly is also called a "motor-driven fan".

The housing 12 is defined by a base wall 22 of the casing 10, which is connected to a peripheral wall 24 of substantially cylindrical shape circular about the axis X-X. The base wall 22 has a central projection 26 in line with the shaft of the motor and two lateral projections 28 each provided with a hole 30 designed for the passage of a fixing screw or similar (not shown), designed to cooperate with the motor enclosure in order to keep it in the housing and immobilise it both axially and with respect to rotation.

The peripheral wall 24 has two protuberances 32 in the form of lugs disposed in regions diametrically opposite each other with respect to the axis X-X (FIGS. 1 and 2). These protuberances each define a flat 34 (FIGS. 1 and 2) suitable for bearing elastically against the outer enclosure 14 of the motor. Furthermore, the peripheral wall 24 has two U-shaped folded-over brackets 36 facing the inside of the housing (FIGS. 1 and 2) and also suitable for bearing against the outer enclosure 14 of the motor.

The motor is thus immobilised radially with respect to the peripheral wall 24, forming an annular passage 38 between the motor enclosure and this peripheral wall.

The peripheral wall 24 is also connected to a front wall 40 of annular shape overall, having a radial extension 42.

The front wall 40 is provided with an edge 44 having a part 46 substantially in the shape of an arc of a circle, extending over three quarters of a circumference, this part 46 being connected to two substantially rectilinear parts 48 extending at approximately 90° with respect to each other and bordering on the extension 42.

On one of the two parts 48 of the edging 44 there is formed a bracket 50 which serves as a support for the pins (not shown) of a connector.

Furthermore, from the peripheral edge 44 there are formed three brackets 52 which fix the support 10 on a volute casing 54 depicted partially in FIG. 3 and suitable for receiving the turbine 20.

Thus the front wall 40 and the casing 54 together define the volute receiving the turbine.

The peripheral wall 24 and the front wall 40 are interrupted, in two diametrically opposite regions, to define two opposite channels serving to cool the electric motor 16. These two channels comprise an inlet channel 56 disposed in the area of the extension 42 and a discharge channel 58 disposed in the opposite region.

The inlet channel 56 is defined by two opposite lateral walls 60 which extend in a substantially radial direction with respect to the axis of rotation of the motor and which are connected to the peripheral wall 24 and to the front wall 40, including at its extension 42.

The two lateral walls 60 are also joined together by a curved wall 62 which extends from the extension 42 to the base wall 22.

As can be better seen in FIGS. 2 and 3, each of the lateral walls 60 is connected to the front wall 40 by an inclined deflecting wall 64.

These two deflecting walls are in a symmetrical configuration with respect to a radial plane P (FIGS. 1 and 2) passing through the axis X-X of rotation of the motor and also passing through the middle of the channel 56.

The deflecting walls 64 act as fins facilitating the guidance of a flow of air taken from the volute and designed to enter the casing through the air inlet channel 56 so as to then come into contact with the enclosure 14 of the motor, and more particularly the movable equipment thereof (brush and collector), so as to cool them and then return to the volute through the discharge channel 58, as depicted by the arrows in FIG. 3.

The discharge channel 58 is defined by two lateral walls 66 which are connected to the peripheral wall 24 and to the front wall 40 and which extend in directions substantially radial to the axis of rotation of the motor.

These two walls 66 are also connected to each other by a curved end wall 68, which extends from the front wall 40 to the base wall 22.

The two lateral walls 66 are connected to the front wall 40 by two inclined deflecting walls 70 with a symmetrical configuration with respect to the radial plane P, which also passes through the middle of the cooling channel 58.

As can be seen in FIG. 2, each deflecting wall 64 has an inner edge AB in the form of an arc of a circle and connected to the peripheral wall 24 and an outer edge CD in the form of an arc of a circle and connected to the front wall 40 by a curved wall 72. Each deflecting wall 64 is connected to the front wall 40 along a radial edge BD and is connected to the lateral wall 60 along a non-radial edge AC.

The radial edge BD is contained in the plane of the front wall 40, while the edge AC is not situated in this plane.

The deflecting wall 64 forms with the front wall 40 a changing angle. The inner edge AB is connected with the front wall 40, forming an angle of around 20°, while the outer edge CD is connected to the front wall 40, forming an angle of around 40°. Thus each of the fins 64 moves progressively away from the plane of the front wall in order to connect to the corresponding lateral wall 60.

Each deflecting wall 64 thus affords a gentle transition between the front wall 40 and the wall 60.

The deflecting walls 70 have a similar configuration to the deflecting walls 64. Each wall 70 is defined by a curved inner edge EF connected to the peripheral wall 24 and an outer curved edge GH connected to the front wall 40 by a curved wall 74. Each deflecting wall 70 is connected to the front wall 40 along a radial edge FH and is connected to the wall 66 of the channel 58 along a non-radial edge EG.

The angle of connection between each deflecting wall 70 and the front wall 40 is 20° at the inner edge EF (FIG. 4) and 40° at the outer edge GH (FIG. 5).

Here again, the deflecting walls 70 ensure a gentle transition between the front wall 40 and the lateral walls 66 of the channel 58, facilitating the guidance of the flow of air following cooling of the motor.

The presence of the deflecting walls 64 around the inlet channel 56 and the deflecting walls 70 around the discharge channel 58 not only facilitates the guidance of the flow of air serving to cool the electric motor, but also reduces the noise level of the operation of the motor-driven fan.

Furthermore, another advantage lies in the fact that the casing 10 can be used whatever the direction of rotation of the motor and turbine.

Of course, the invention is not limited to the embodiment described above by way of example.

In a simplified version, it is possible to provide a single deflecting wall for each cooling channel, so long as the casing is adapted to receive a motor rotating in a given direction.

It is also possible to give the inclined deflecting walls other forms, in particular as regards the values of the angle of connection to the front wall.

The device of the invention essentially finds an application in the motor-driven fans used in heating and/or air conditioning equipment for motor vehicles.

What we claim is:

1. A device for supporting an electric motor driving a turbine, comprising a casing formed so as to define a housing to receive an enclosure of the motor, which opens out into a volute for receiving the turbine, the housing comprising a base wall connected to a peripheral wall, the peripheral wall connected to a substantially annular front wall forming part of the volute, and in which the peripheral wall is interrupted so as to define at least one channel for cooling the motor, said cooling channel being defined by two lateral walls opposite each other which extend in a substantially radial direction with respect to an axis of rotation of a shaft of the motor, at least one of the two lateral walls of the cooling channel being connected to the annular front wall by an inclined deflecting wall.

2. The device of claim 1, wherein the deflecting wall of the cooling channel is situated to the front of the channel with respect to the direction of rotation of the turbine.

3. The device of claim 1, wherein the two lateral walls of the cooling channel are each connected to the front wall by two deflecting walls.

4. The device of claim 3, wherein the two deflecting walls of the cooling channel are in a symmetrical configuration with respect to a radial plain passing through the axis of rotation of the motor shaft and passing through the middle of the cooling channel.

5. The device of claim 1, in which the deflecting wall has a curved inner edge and a curved outer edge, wherein the deflecting wall is connected to the front wall, forming with it an angle of connection which varies from the inner edge to the outer edge.

6. The device of claim 5, wherein the angle of connection is smaller at the inner edge than at the outer edge.

7. The device of claim 6, wherein the angle of connection at the inner edge is around 20° and the angle of connection at the outer edge is around 40°.

8. The device of claim 1, wherein the deflecting wall is connected to the front wall along a radial edge contained in the plane of the front wall.

9. The device of claim 1, wherein the deflecting wall is connected to the lateral wall of the cooling channel along a non-radial edge.

10. The device of claim 1, wherein the peripheral wall is interrupted so as to define two opposite cooling channels.

* * * * *